2 Sheets—Sheet 1.

W. WELCH.

INDICATOR FOR PUNCHING MACHINES.

Reissued Aug. 22, 1876.

No. 7,277.

INVENTOR

William Welch.

WITNESSES

Wm A. Skinkle

J. Stich

By his Attorney

Wm D. Baldwin

N. PETERS, PHOTO-LITHOGRAPHER, WASHINGTON, D. C.

W. WELCH.

INDICATOR FOR PUNCHING MACHINES.

No. 7,277. Reissued Aug. 22, 1876.

WITNESSES

Wm A Skinkle

J. Stich

By his Attorney

INVENTOR

William Welch.

Wm D. Baldwin

N. PETERS, PHOTO-LITHOGRAPHER, WASHINGTON, D. C.

UNITED STATES PATENT OFFICE.

WILLIAM WELCH, OF BRIDGEPORT, CONNECTICUT, ASSIGNOR, BY MESNE ASSIGNMENTS, TO ROBERT T. CLARK.

IMPROVEMENT IN INDICATORS FOR PUNCHING-MACHINES.

Specification forming part of Letters Patent No. 69,877, dated October 15, 1867; reissue No. 7,277, dated August 22, 1876; application filed August 8, 1876.

*To all whom it may concern:*

Be it known that I, WILLIAM WELCH, of Bridgeport, in the county of Fairfield and State of Connecticut, have invented a new and Improved Indicator for Punching-Machines; and I do hereby declare that the following is a full, clear, and exact description thereof, which will enable others skilled in the art to make and use the same, reference being had to the accompanying drawings, forming part of this specification, and in which—

Figure 1:
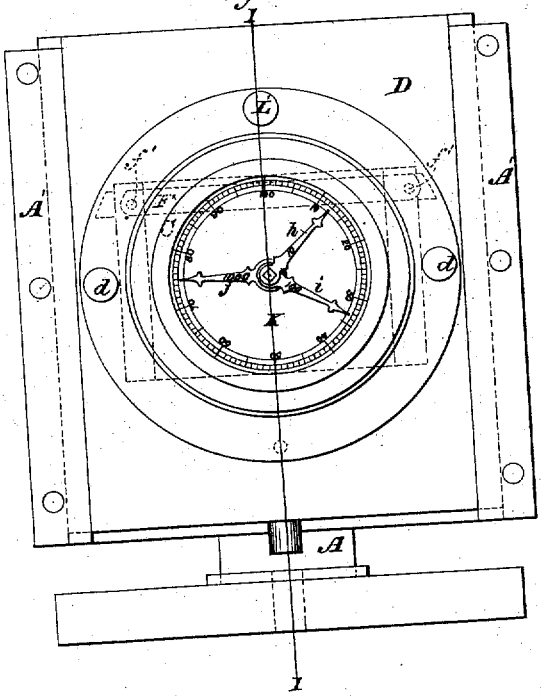
Figure 2:
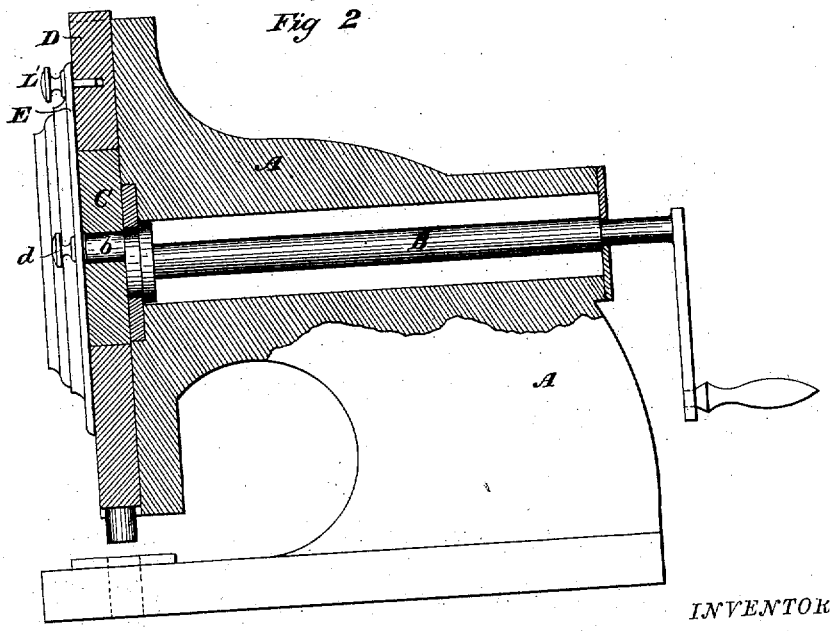
Figure 4:
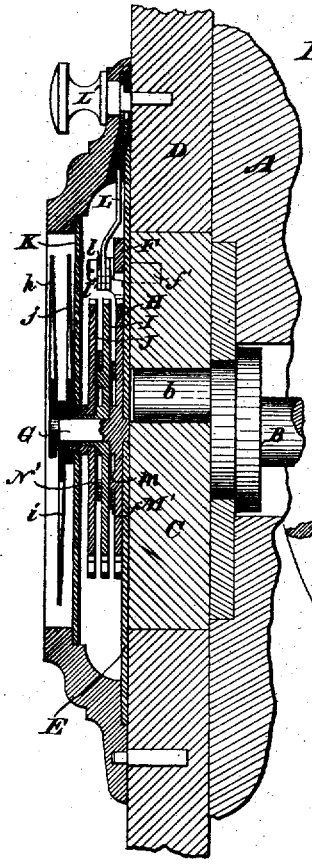
Figure 3:
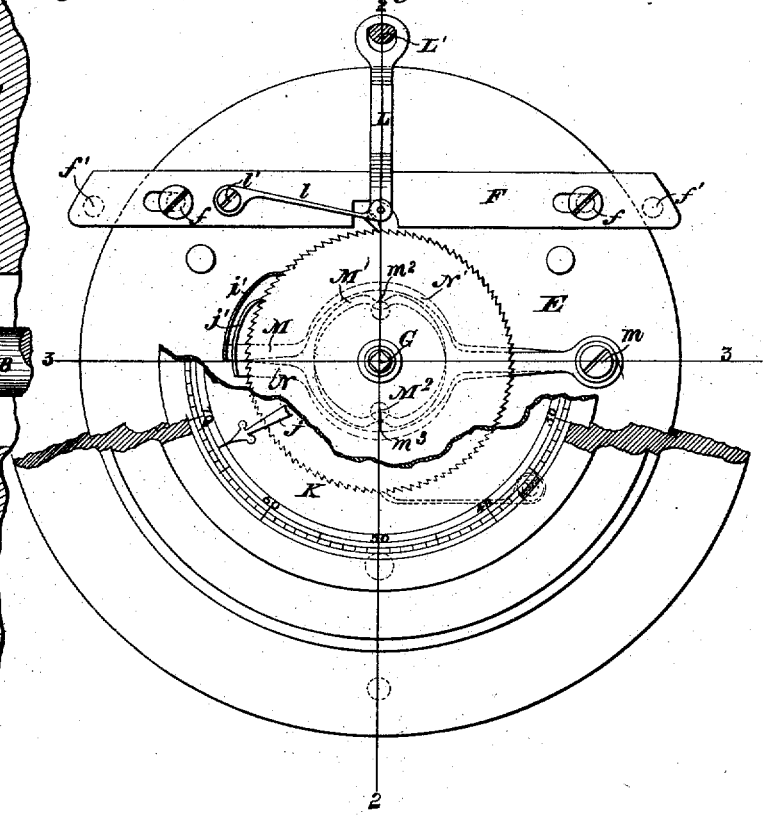
Figure 5:
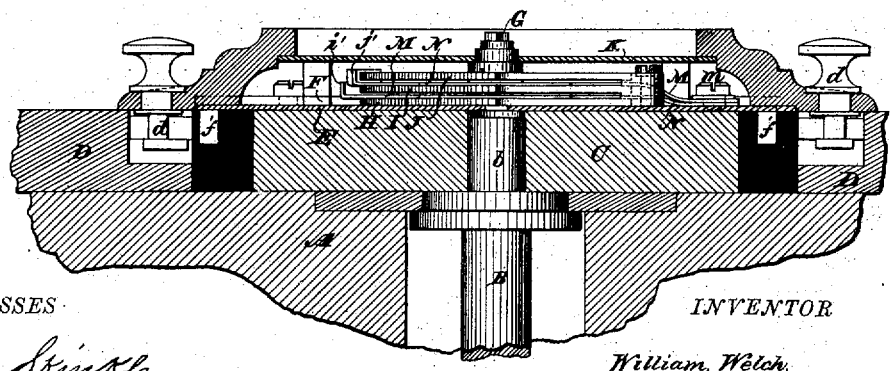

Figure 1 represents a front view of so much of my improved apparatus as is necessary to illustrate the subject-matter herein claimed. Fig. 2 is a vertical longitudinal section therethrough on the line 1 1 of Fig. 1. Fig. 3 represents a face view of the apparatus with portions of the casing and covering mechanism broken away, to show the details of the invention more clearly. Fig. 4 represents a vertical transverse section through the apparatus on the line 2 2 of Fig. 3, and Fig. 5 a horizontal transverse section therethrough on the line 3 3 of Fig. 3.

Similar letters of reference indicate like parts in all the figures.

This invention relates to a new device by which the number of strokes of punches, shears, milling-machines, and all machines in which reciprocating motion is employed, can be registered. The device is also so organized that the registering apparatus may be put at rest when it is not desired that the strokes should be counted—as, for instance, when lubricating, repairing, or testing the machine. The subject-matter claimed will hereinafter specifically be designated.

The accompanying drawings represent my improved apparatus as adapted to a machine for punching metals. The mechanism is mounted in a stout main frame, A, in which a shaft, B, driven from any suitable prime mover, revolves in suitable bearings. An eccentric or crank, *b*, on this shaft works in a box, C, fitting snugly, but capable of moving freely laterally, in a recess in the face of the gate D of the punch, which gate moves freely vertically in guides in the standards A′ of the frame, as usual. By this means it will be observed that both a horizontal and a vertical reciprocating movement is imparted to the box. On the inner face of a cap, E, fitted to the gate by means of L-shaped knobs *d d*, (in the manner described in an application for a patent filed by me on or about the 1st day of April, 1867,) is arranged a bar, F, sliding horizontally on guide-pins *f*, and having on each of its ends a stud or pin, *f′*. These pins fit around the sides of the box C, and as the latter moves sidewise in the gate it pushes the bar sidewise. A spindle or arbor, G, firmly fixed to and projecting from the face of the cap E, supports three ratchet-wheels, H I J, turning loosely thereon. The innermost ratchet-wheel H may, however, if desired, be mounted on the spindle, and the latter hung in the cap-plate so as to turn, as shown. Outside and in front of the ratchet-wheels is a stationary dial-plate, K, which is divided into one hundred, more or less, equal spaces, which are marked with appropriate figures, as shown in Fig. 1. Each of the ratchet-wheels above mentioned has connected with it a hand or pointer, *h i j*, by which the number of revolutions or moves made by them is indicated on the dial-plate. The hand *h* is fitted on the spindle and turns with the wheel H; the hand *i* is fitted around the tubular projection of the wheel I, and the hand *j* is, in a similar manner, connected with its disk J. A spring, *l*, pivoted at *l′* on the bar F, presses the lower end of a pointed rod or plate, L, into the teeth of the wheel H, this bar being pivoted at its upper end on an eccentric rock-shaft, L′, and being capable of swinging freely at its lower end. As the plate F reciprocates in one direction its point slips over the teeth of the ratchet-wheel, and on the return stroke engages with one of the teeth, and thereby moves it one step, consequently moving the hand *h* correspondingly on the dial-plate. This rod or pawl can be thrown out of contact with the ratchet-wheel H, when desired, by turning the eccentric rock-shaft L′, and when thus turned the indicator will not be actuated by the working of the punch.

Metal plates or radius-bars M and N, respectively pivoted on the cap-plate at *m*, are interposed between the ratchet-wheels H, I, and J, and carry at their outer ends spring-pawls $i'$ $j'$, which act upon the teeth of their corresponding ratchet-wheels I and J. These plates or radius-bars are provided with eccentric yokes or slots $M^1$ $N'$, around the spindle or arbor which carries the ratchet-wheels. A pin, $M^2$, on the face of the ratchet-wheel H works in the eccentric slot in the plate M, which slot has two projecting portions, $m^2$ $m^3$, against which the pin strikes as it turns with the ratchet-wheel H. When it strikes against the lower projecting portion $m^3$, it depresses its plate M, retracting the pawl and moving it into the next tooth below. When it strikes the upper projecting portion $m^2$, it raises the plate, thereby pushing the spring-pawl up, and turning the disk or ratchet-wheel I so far that its indicator $i$ will move one step on the dial. Thus each stroke of the gate is registered by the hand $h$, each revolution of the disk or ratchet-wheel H by the hand $i$, and each revolution of the ratchet-wheel I by the hand $j$, as the disk or ratchet-wheel J is moved by means of a pin on the wheel I in the same manner as the wheel I is moved by the pin $M^2$ on the wheel H, and by the eccentric yoke and spring-pawl, as above described.

Any number of such disks or wheels and hands can be arranged on any one machine, whereby, if desired, an indefinite number of strokes can be registered.

What I claim as new, and desire to secure by Letters Patent, is—

The combination, with a punch, of registering mechanism which indicates the number of actuations of the punch.

WILLIAM WELCH.

Witnesses:
O. T. EARLE,
H. P. CLARKE.